(12) United States Patent
    Kishimoto

(10) Patent No.: US 9,091,861 B2
(45) Date of Patent: Jul. 28, 2015

(54) SCANNING MICROSCOPE

(71) Applicant: NIKON CORPORATION, Tokyo (JP)

(72) Inventor: Hiroshi Kishimoto, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 365 days.

(21) Appl. No.: 13/762,854

(22) Filed: Feb. 8, 2013

(65) Prior Publication Data

US 2013/0175433 A1    Jul. 11, 2013

Related U.S. Application Data

(63) Continuation of application No. PCT/JP2011/068313, filed on Aug. 10, 2011.

(30) Foreign Application Priority Data

Aug. 12, 2010    (JP) .................................. 2010-181015

(51) Int. Cl.
    *G02B 21/36*    (2006.01)
    *G02B 21/00*    (2006.01)

(52) U.S. Cl.
    CPC ............ *G02B 21/361* (2013.01); *G02B 21/002* (2013.01); *G02B 21/365* (2013.01)

(58) Field of Classification Search
    CPC ........... H01L 2224/16225; H01L 2224/48091; H01L 2924/15311; H01L 2924/1641; H01L 2224/00014; G02B 21/361; G02B 21/002; G02B 21/365
    See application file for complete search history.

(56) References Cited

U.S. PATENT DOCUMENTS

2009/0284815 A1*   11/2009   Tanioka .................... 359/198.1

FOREIGN PATENT DOCUMENTS

| DK | WO2014117782 | * | 1/2014 |
|----|--------------|---|--------|
| JP | A-11-271626  |   | 10/1999 |
| JP | A-2000-147395 |  | 5/2000 |
| JP | A-2000-267011 |  | 9/2000 |
| JP | A-2003-344781 |  | 12/2003 |
| JP | A-2004-15636 |   | 1/2004 |
| JP | A-2009-145826 |  | 7/2009 |

OTHER PUBLICATIONS

Feb. 12, 2013 International Preliminary Report on Patentability issued in International Application No. PCT/JP2011/068313 (with translation).
Office Action issued in Japanese Application No. 2012-528707 mailed May 1, 2014 (with translation).

* cited by examiner

*Primary Examiner* — Tony Ko
(74) *Attorney, Agent, or Firm* — Oliff PLC

(57) ABSTRACT

The present invention relates to a scanning microscope, which can acquire an undistorted image of a desired area of a sample using a simple configuration. When a sample is observed, a galvano-scanner rotates a scanning mirror based on a supplied driving signal, so as to scan the sample with illumination light. A sampling circuit samples an electric signal acquired by performing photoelectric conversion on observation light from the sample, in synchronization with a sampling clock. If the scanning mirror is driven so that the rotation angle thereof non-linearly changes with respect to time, the sampling circuit appropriately suppresses sampling based on the sampling clock, so that sampling is executed only when the scanning mirror is at a predetermined position. The present invention can be applied to a scanning microscope.

21 Claims, 10 Drawing Sheets

FIG. 7

| CONTROL DATA | DRIVING DATA |
|---|---|
| CONTROL DATA | DRIVING DATA |
| ⋮ | ⋮ |
| CONTROL DATA | DRIVING DATA |

TB11

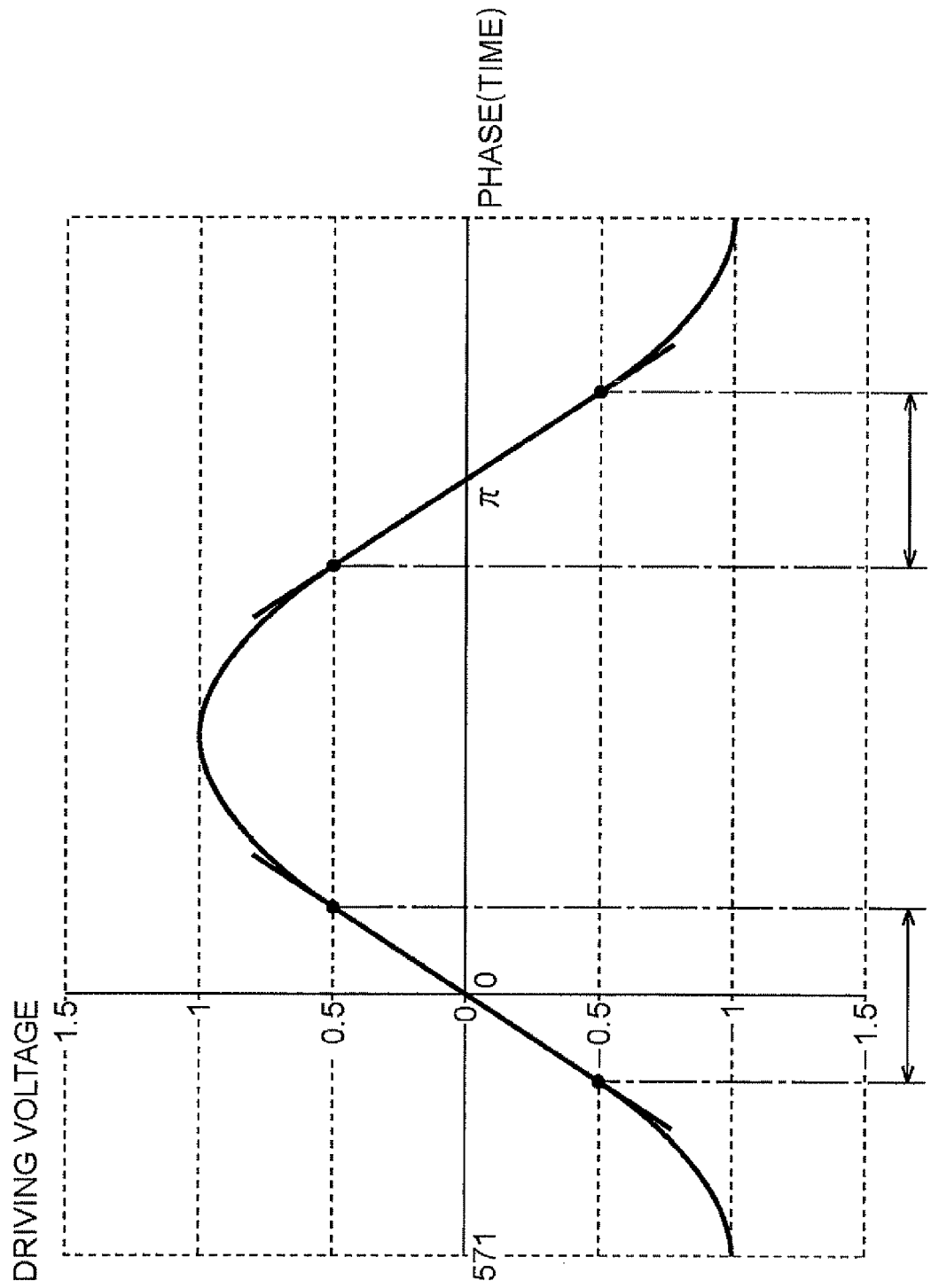

SCANNING MICROSCOPE

This is a Continuation of International Application No. PCT/JP2011/068313 filed Aug. 10, 2011, which claims the benefit of Japanese Patent Application No. 2010-181015 filed Aug. 12, 2010. The disclosure of the prior application is hereby incorporated by reference herein in its entirety.

TECHNICAL FIELD

The present invention relates to a scanning microscope which allows acquiring an undistorted image of a desired area of a sample by a simple configuration when the sample is observed by scanning the sample at high speed.

BACKGROUND ART

A scanning microscope that scans an observation surface of a sample with an illumination light using a galvano-scanner, and acquires a two-dimensional observation image of the observation surface has been available. In such a scanning microscope, observation light generated from the observation surface by irradiation of illumination light is photo-electric converted and an electric signal acquired as a result is sampled, whereby data of each pixel of the observation image is generated.

If an electric signal is sampled at an equal time interval when the observation image is acquired, a scanning mirror of the galvano-scanner must be moved at a constant velocity during the period of acquiring the observation image, in order to acquire an undistorted observation image.

Normally a position (rotation angle) of the scanning mirror is in proportion to the voltage value of a driving signal of the galvano-scanner (hereafter called "driving voltage"), therefore if the scanning mirror is driven at a constant velocity, the driving voltage linearly changes along with time.

On the other hand, when the observation image is acquired, the observation surface is repeatedly scanned, hence after the scanning mirror is driven for a predetermined period at a constant velocity, driving for inverting the moving direction of the scanning mirror and returning the scanning mirror back to the original position is always required. During this time the scanning mirror is driven so as to decelerate, stop and reaccelerate, and the driving voltage of the driving signal for this driving changes non-linearly with respect to time. The observation image is not acquired in a period when the driving voltage changes non-linearly. Thus in the case of scanning by deflecting the scanning mirror, the driving signal has a period when the driving voltage linearly changes in the time direction and a period when the driving voltage non-linearly changes in the time direction.

If the scanning mirror is driven at high speed close to the limit of the performance of the scanner, it is known that the ratio of the resonance frequency components unique to the galvano-scanner in the frequency components of the driving signal become high, and operation of the scanning mirror becomes unstable.

In other words, the observation surface is normally scanned by a driving signal having a serrated waveform, where a period when the driving voltage changes linearly and a period when the driving voltage changes non-linearly are combined. In this case, high frequency components are included in the period when the driving voltage changes non-linearly, but as the driving velocity of the scanning mirror increases, the ratio of the resonance frequency components included in this non-linear period increases, which make the operation of the scanning mirror unstable.

Therefore in the case of driving the scanning mirror at high speed, the scanning mirror can be more stably driven if the scanning mirror is driven by a sinusoidal driving signal constituted by a single frequency component, rather than being driven by a serrated driving signal. However in the case of a sinusoidal driving signal, the change of amplitude of the driving signal becomes non-linear, because of the nature of a sinusoidal wave, which means that the rotation angle of the scanning mirror non-linearly changes with respect to time, and if an electric signal is sampled at a predetermined time interval to acquire an observation image, the observation image is distorted.

To solve this problem, a method of optically generating a sample clock using an optical member disposed on the rear face side of the scanning mirror is proposed, so that the sampling clock linearly changes with respect to the rotation angle of the scanning mirror, and an undistorted image is acquired (e.g. see Patent Document 1).

Another possibility is limiting an effective scanning range on a sample, and decreasing the influence of distortion of the observation image by using only a period having high linearity in the waveform of the driving signal. In this case, if the phase angle of a sinusoidal wave as a driving signal is 0 to $2\pi$, the waveform of the driving signal changes almost linearly in the periods when the phase is near 0 and $2\pi$, hence a less distorted observation image can be acquired even if sampling is performed at a predetermined time interval, if the scanning image is very small.

Another available method is generating a sampling clock with a variable interval using an electronic circuit, by sampling a position signal or a driving signal of a scanning mirror for a short time, and adjusting the oscillation frequency, which is a source of the sampling clock, so that the deviation of the position of the scanning mirror becomes constant (e.g. see Patent Document 2).

[Patent Document 1] Japanese Patent Application Laid-Open No. 2000-147395
[Patent Document 2] Japanese Patent Application Laid-Open No. 2004-15636

However in the case of the method for acquiring an observation image using only a period when the driving signal has high linearity, an area regarded as a straight line in a sinusoidal wave is so limited that the effective scanning range on the sample becomes small, and only an observation image of a narrow partial area of the sample can be acquired. In such a case, if the resolution of the observation image is increased, scanning time per pixel becomes short and quality of the observation image drops.

In the case of the method for generating a sampling clock by disposing an optical member on the rear face side of the scanning mirror, the optical member disposed on the rear face side of the scanning mirror and a detection circuit for generating the sampling clock are required, which makes configuration complicated and increases cost. In this method, a change of the amplitude of the scanning minor changes the moving range of the optical member, which means that a sampling clock in an arbitrary scanning range cannot be generated, and the scanning range is limited to a predetermined range.

In the case of variably changing the oscillation frequency to be a source of the sampling clock, configuration of the circuit to generate the clock for acquiring an image becomes complicated, and increases cost. Furthermore if the sampling clock is based on variable frequency, clock cycle becomes unstable, causing a drop in image quality of the observation image.

DISCLOSURE OF THE INVENTION

With the foregoing in view, it is an object of the present invention to provide a technique to acquire an undistorted image of a desired area of the sample, using a simple configuration, when the sample is scanned at high speed and observed.

A first scanning microscope of the present invention comprises: a scanning unit that deflects illumination light from a light source by controlling a scanning member based on a driving signal which non-linearly changes with respect to time; an optical detection unit that receives observation light from a sample and performs photoelectric conversion on the observation light so as to generate an electric signal; a sampling unit that samples the electric signal generated by the optical detection unit; and an imaging unit that generates an observation image of the sample, based on the sampled electric signal, wherein the cycle of the sampling is an integral multiple of a predetermined cycle.

A second scanning microscope of the present invention comprises: a scanning unit that deflects illumination light from a light source by controlling a scanning member based on a driving signal, and outputs a position signal to indicate a position of the controlled scanning member; an optical detection unit that receives observation light from a sample and performs photoelectric conversion on the observation light so as to generate an electric signal; a sampling unit that samples the electric signal generated by the optical detection unit; and an imaging unit that generates an observation image of the sample, based on the sampled electric signal, wherein the cycle of the sampling is an integral multiple of a predetermined cycle.

According to the present invention, when a sample is observed by scanning the sample at high speed, an undistorted image of a desired area of the sample can be acquired using a simple configuration.

BRIEF DESCRIPTION OF THE DRAWINGS

FIG. 7 shows an example of the driving table;

FIG. 10 shows an example of a method for determining an approximate line.

BEST MODE FOR CARRYING OUT THE INVENTION

Embodiments of the present invention will now be described with reference to the drawings.

Embodiment 1

Configuration of Scanning Microscope

Figure 1:
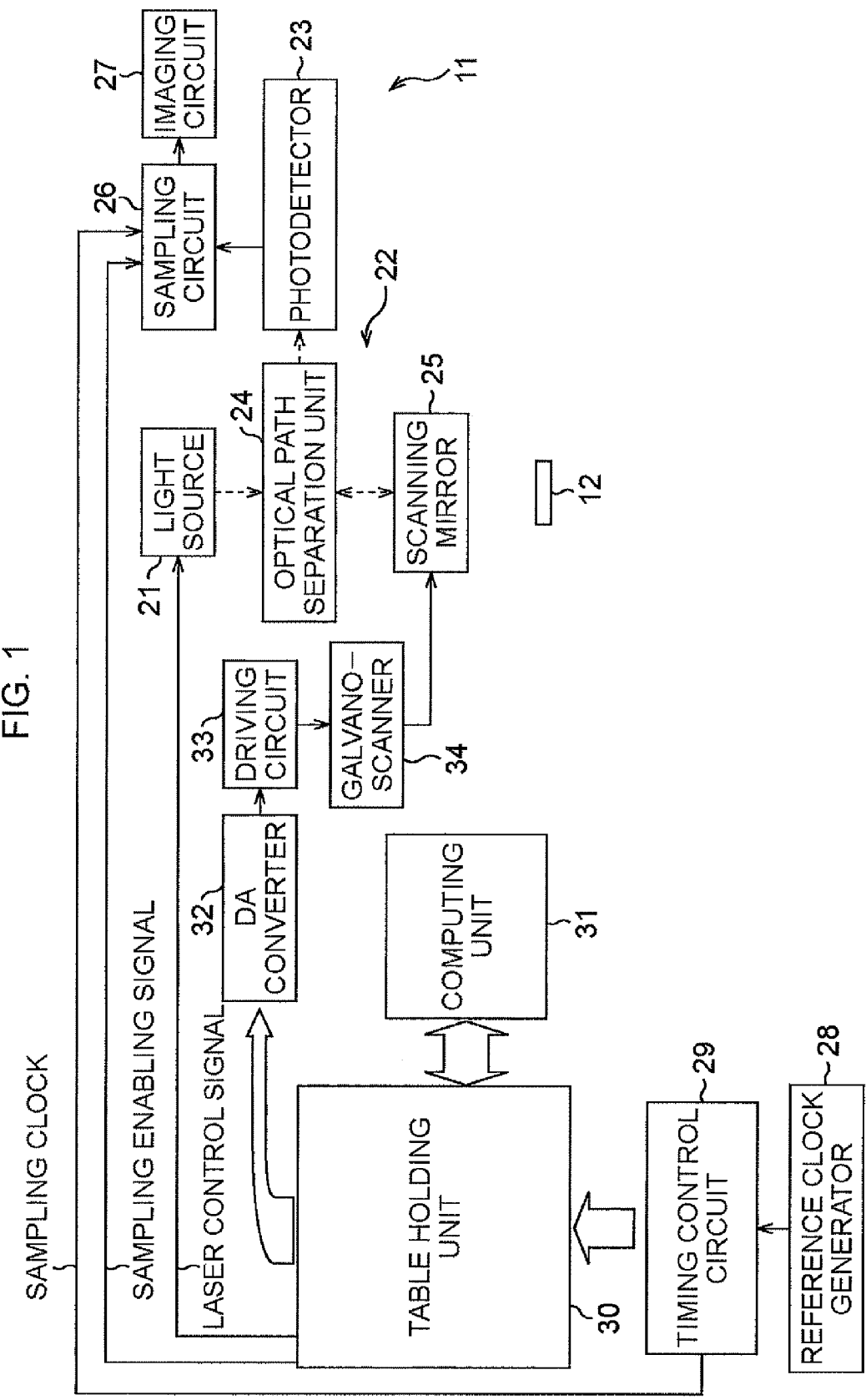
FIG. 1 is a diagram depicting a configuration example of an embodiment of a scanning microscope to which the present invention is applied.

FIG. 1 is a diagram depicting a configuration example of an embodiment of a scanning microscope to which the present invention is applied.

A scanning microscope 11 is constituted by a confocal microscope which irradiates illumination light as excitation light onto a sample 12 on a stage (not illustrated), receives fluorescence generated from the sample 12 thereby (hereafter called "observation light"), and acquires an observation image of the observation surface of the sample 12.

In other words, a light source 21 for emitting the illumination light is installed in the scanning microscope 11, and the illumination light from the light source 21 is irradiated onto the sample 12 via an optical system 22. The optical system 22 also guides the observation light generated from the sample 12 to a photodetector 23.

The optical system 22 at least includes: an optical path separation unit 24 which is an optical system constituted by a dichroic minor for transmitting the illumination light and reflecting the observation light and a lens; and a scanning mirror 25 that allows the illumination light to scan the observation surface of the sample 12 by deflecting the illumination light. For example, the observation light from the sample 12 is descanned by the scanning mirror 25 via the objective lens or the like (not illustrated) constituting the optical system 22, is reflected by the dichroic minor of the optical path separation unit 24, and enters the photodetector 23.

The photodetector 23 performs photo-electric conversion on the entered observation light so as to convert the observation light into an electric signal having a value according to the light receiving intensity of the observation light, and supplies the electric signal to a sampling circuit 26. The sampling circuit 26 samples an electric signal supplied from the photodetector 23 at a predetermined timing, and supplies the sampled electric signal to an imaging circuit 27. The imaging circuit 27 constructs an observation image based on the electric signal supplied from the sampling circuit 26, and outputs the observation image to a monitor (not illustrated) or a processing system in a subsequent step.

In the scanning microscope 11, a reference clock generator 28 is installed, and the reference clock generator 28 generates a reference clock to be a reference of the operation timing of the scanning microscope 11 in general, and supplies the reference clock to a timing control circuit 29.

The timing control circuit 29 converts the reference clock from the reference clock generator 28 into a clock having a predetermined frequency, so as to generate a read clock to read data, at a predetermined cycle, from a driving table held in a table holding unit 30.

The driving table is constituted by driving data to indicate driving voltage, which is a value of the driving signal at each moment for rotating the scanning mirror 25, and control data attached to the driving data, and the driving data and the control data at each moment are stored in a memory inside the table holding unit 30. The control data is constituted by a laser control signal which controls ON/OFF of the light source 21, and a sampling enabling signal which indicates enable/disable of the sampling of electric signals to acquire an observation image.

The timing control circuit 29 generates, in synchronization with the generated read clock, an address where driving data and control data to be read from the driving table are stored, and supplies the address to the table holding unit 30. The table holding unit 30 reads the driving data and the control data stored in the address supplied from the timing control circuit 29, and supplies the driving data, that is the driving signal, to a DA (Digital/Analog) convertor 32. The table holding unit 30 supplies the laser control signal and the sampling enabling signal of the read control data to the light source 21 and the sampling circuit 26 respectively.

If the user specifies the waveform of the driving signal, the computing unit 31 generates the driving table, and records the driving table in the table holding unit 30.

Based on the reference clock from the reference clock generator 28, the timing control circuit 29 also generates a sampling clock to indicate a timing to sample an electric signal outputted from the photodetector 23, and supplies the sampling clock to the sampling circuit 26. This sampling clock has a predetermined timing relationship with the read clock, and the sampling circuit 26 samples an electric signal in synchronization with the sampling clock.

The DA convertor 32 converts the driving signal, supplied from the table holding unit 30, from a digital signal into an analog signal, and supplies a driving signal converted into the analog signal to a driving circuit 33. The driving circuit 33 drives a galvano-scanner 34 based on the driving signal from the DA convertor 32, and rotates the scanning mirror 25 secured in the galvano-scanner 34. The galvano-scanner 34 is constituted by a galvano motor and the like, and reciprocates, within a predetermined range, the axis of the galvano motor where the scanning mirror 25 is secured, according to the control of the driving circuit 33.

[Driving of Galvano-Scanner]

Driving of the galvano-scanner 34 will be described next.

Figure 2:
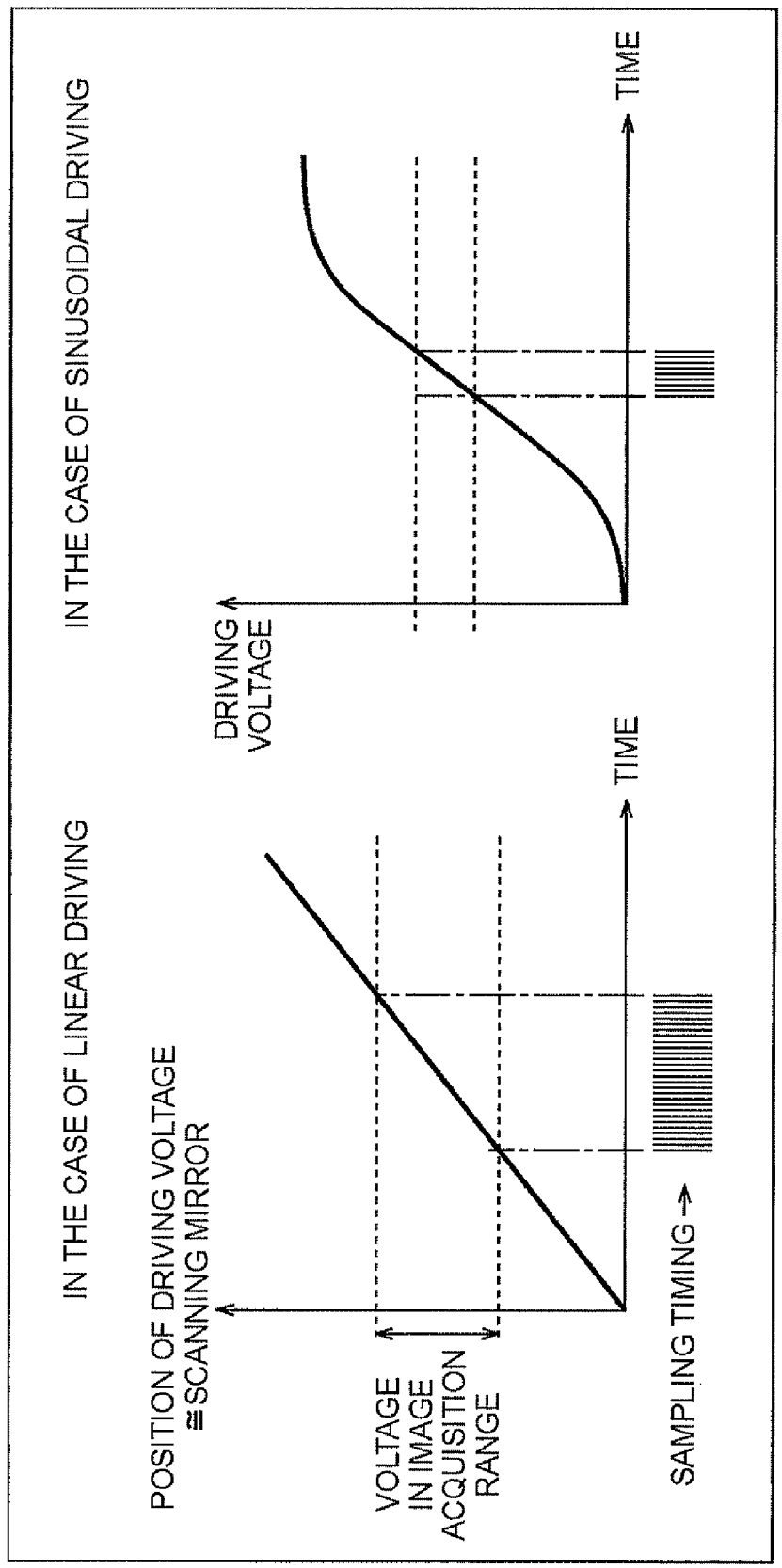
FIG. 2 is a diagram depicting a driving signal and a sampling timing.

For example, as shown at the left in FIG. 2, it is assumed that the galvano-scanner 34 is driven, so that the value of the driving signal, that is, the driving voltage, changes linearly in the time direction. In FIG. 2, the ordinate indicates driving voltage, and the abscissa indicates time.

The driving voltage of the driving signal changes linearly with respect to the change of the rotation angle of the scanning mirror 25, that is, the change of the position of the scanning mirror 25. Therefore if the driving signal, which changes linearly along with time, is supplied to the galvano-scanner 34, the scanning mirror 25 is rotated by the galvano-scanner 34 at a predetermined velocity, and the illumination light irradiated onto the sample 12 moves on the observation surface of the sample 12 at a predetermined velocity.

In this case, if a sampling clock having a predetermined cycle is supplied to the sampling circuit 26, that is, if sampling is performed at a predetermined time interval, then each area which is arranged on the sample 12 with an equal interval is displayed in each pixel of the observation image, and an undistorted observation image is acquired.

However as mentioned above, in order to stably drive the galvano-scanner 34 at high speed, the galvano-scanner 34 must be driven by a driving signal having a sinusoidal waveform, as shown at the right side in FIG. 2, due to the nature of the galvano-scanner 34.

In the case of such a driving signal having a sinusoidal waveform, the period which can be approximated to linearly changing a waveform is so short that the observation image is distorted over a wide range.

In other words, in the period where the waveform of the driving signal non-linearly changes, the scanning mirror 25 does not rotate at a constant velocity, hence the moving velocity of the illumination light irradiated onto the sample 12 on the observation surface of the sample 12 is not constant either. In this case, if the electric signal is sampled by the sampling circuit 26 at a predetermined time interval, each area that is arranged at an unequal interval on the sample 12 is displayed on each pixel of the observation image, and the observation image is distorted.

To prevent this problem, in the scanning microscope 11, a sampling clock remains at a clock having a predetermined cycle, and the sampling control is performed by the sampling enabling signal so that the electric signal corresponding to the observation light from the areas arranged with an equal interval on the sample 12 is sampled. In other words, sampling is executed not at all the sampling timings indicated by the sampling clock, but only at some timings out of these sampling timings. Thereby even if the waveform of the driving signal is sinusoidal, an undistorted observation image is acquired without adjusting the frequency of the sampling clock.

Figure 3:
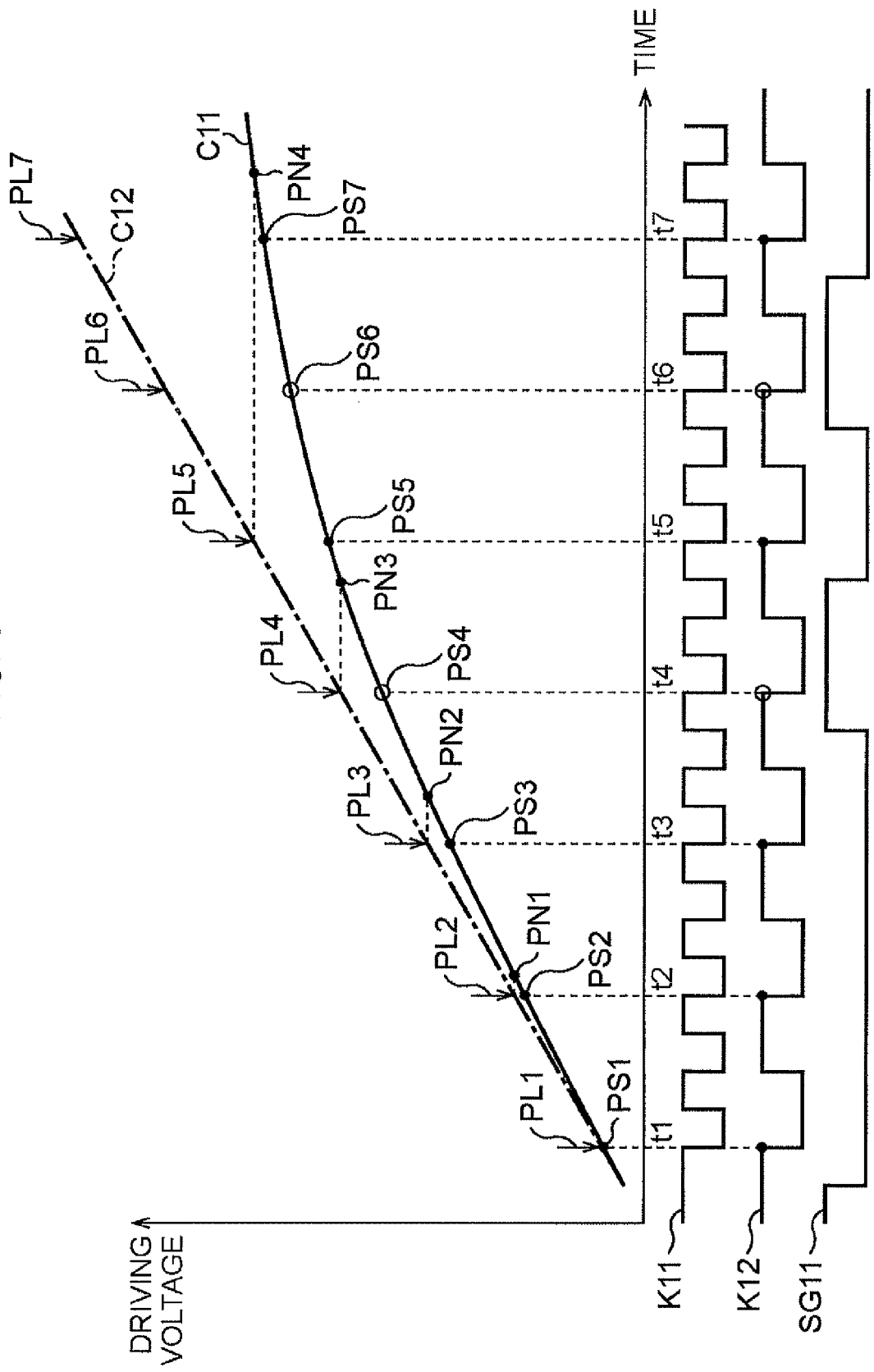
FIG. 3 is a diagram depicting generation of a driving table.

In concrete terms, if the galvano-scanner 34 is driven by the drive signal having the waveform indicated by the curve C11, as shown in FIG. 3 for example, the driving data of the driving table and the control data are generated based on the waveform (shape and form of the signal) of this driving signal.

FIG. 3 is an enlarged view of a sinusoidal driving signal from a portion where the inclination of the waveform is close to a straight line to a portion where curvature increases. In FIG. 3, the ordinate indicates driving voltage, and the abscissa indicates time. The bottom of FIG. 3 also shows a waveform of the read clock K11 that is supplied to the table holding unit 30, a sampling clock K12 that is supplied to the sampling circuit 26, and a waveform of the sampling enabling signal SG11. K11, K12 and SG11 are all digital signals and take a value of either high or low (in FIG. 3 the higher position of each signal is high, and the lower position of each signal is low).

In the read clock K11, a timing when the waveform rises is the timing to read the driving table, and in the sampling clock K12, a timing when the waveform falls is the timing to sample the electric signal. The sampling is actually executed in the period when the sampling enabling signal SG11 is Low, and the actual sampling is stopped when the sampling enabling signal SG11 is High, even if the sampling clock indicates the sampling timing.

If the scanning microscope 11 rotates the scanning mirror 25 with a driving signal which is linear with respect to time, assuming that the tangential line C12 at the inflection point of the curve C11 is an approximate line, sampling is executed at each moment of moment t1 to moment t7 when the sampling clock K12 falls. In other words, sampling is executed when the scanning mirror 25 is at a position corresponding to the driving voltage at each moment of moment t1 to moment t7 of the tangential line C12.

In this case, the position of the scanning mirror 25 changes linearly with respect to time, hence an undistorted observation image is acquired. Actually in the scanning microscope 11 however, the scanning mirror 25 is rotated according to a driving signal indicated by the curve C11.

In comparing the driving voltage of the tangential line C12 and the curve C11 at each moment of moment t1 to moment t7, the driving voltage value of the tangential line C12 and that of the curve C11 approximately match at moment t1, but as time elapses, the difference of the driving voltage values between the tangential line C12 and the curve C11 increases.

In other words, if sampling is executed while rotating the scanning mirror 25 according to the driving signal of the curve C11, the actual position of the scanning mirror 25 during sampling deviates away from an ideal position as time elapses. Therefore the observation image is distorted more in the area of pixels acquired by sampling at later timings.

However if the scanning mirror 25 is rotated according to the driving signal of the curve C11, deviation from an ideal position of the scanning mirror 25 increases as time elapses, but the scanning mirror 25 eventually reaches an ideal position where the sampling should be executed.

Hence the scanning microscope 11 specifies the driving voltage values at point PL1 to PL7 corresponding to the moment t1 to moment t7 on the tangential line C12, and generates the sampling enabling signal SG11 so that sampling is executed at each timing where a driving voltage value of the curve C11 becomes a specified driving voltage value.

For example, the scanning microscope 11 sequentially compares the driving voltage values at the point PS1 to PS7 on the curve C11, and the voltage values at the point PL1 to PL7 on the tangential line C12, at the moment t1 to moment t7. First the scanning microscope 11 compares the driving voltage values at the point PS1 and the point PL1 at moment t1, and since there is virtually no difference in these driving voltage values, the scanning microscope 11 sets the value of the sampling enabling signal SG11 at the moment t1 to a value to indicate "enable", regarding that sampling is executed at the moment t1.

Then the scanning microscope 11 compares the driving voltage values at the point PS2 and the point PL2 at the moment t2, and since there is virtually no difference in these driving voltage values, the scanning microscope 11 regards that sampling is executed at the moment t12. In other words, in the curve C11, it is actually at the point PN1 when the driving voltage value becomes the same as the driving voltage value at the point PL2, but the sampling enabling signal SG11 at the moment t2 is enabled since the distance in time between the point PS2 and the point PN1 is sufficiently short.

In the same manner, in the curve C11, it is actually at the point PN2 when the driving voltage value becomes the same as the driving voltage value at the point PL3, but the sampling enabling signal SG11 at the moment t3 is enabled since the distance in between the point PS3 and the point PN2 is sufficiently short.

To be more specific, if the difference between the driving voltage value at a point on the curve C11 and the driving voltage value at a point on the tangential line C12 is a predetermined threshold th or less, the sampling enabling signal SG11 at a moment corresponding to the point on the curve C11 is enabled. Here the threshold th is a voltage value of the driving signal that is required for rotating the scanning mirror 25 for N times or 1/N times (N is any number equal to or greater than 1) of a distance between adjacent pixels on the observation image according to the required accuracy of the image. In other words, if the driving voltage of the driving signal is increased by a voltage value corresponding to the threshold th from a state where the scanning mirror 25 is at a predetermined position, the scanning mirror 25 rotates and the irradiation position of the illumination light on the sample 12 moves for a distance corresponding to one pixel of the observation image.

Then the scanning microscope 11 compares driving voltage values at the point PS4 and the point PL4 at the moment t4, and since the difference of the driving voltage values is greater than the threshold th, the scanning microscope 11 disables the sampling enabling signal SG11 at the moment t4. The scanning microscope 11 also compares the driving voltage values at the point PL4 at the moment t4 and at the point PS5 at the moment t5, and since the difference of the driving voltage values is the threshold th or less, the scanning microscope 11 enables the sampling enabling signal SG11 at the moment t5.

In other words, in the curve C11, it is at the point PN3 when the driving voltage value becomes the same as the driving voltage value at the point PL4, but the sampling is executed not at the moment t4, but at the moment t5, since the point PN3 is closer to the point PS5 than to the point PS4.

In the same manner, in the curve C11, it is at the point PN4 when the driving voltage value becomes the same as the driving voltage at the point PL5 at the moment t5, and the point PS7 is closest to the point PN4, therefore the sampling enabling signal SG11 at the moment t6 is disabled, and the sampling enabling signal SG11 at the moment t7 is enabled.

In the scanning microscope 11, the sampling enabling signal SG11 is generated by repeating the above mentioned processing. In the example in FIG. 3, the sampling enabling signal SG11 is enabled at each of the moment t1 to the moment t3, is disabled at the moment t4, is enabled at the moment t5, then is disabled at the moment t6, and is enabled again at the moment t7. In other words, the electric signal is sampled at the moments t1 to t3, t5 and t7.

In the case of sampling the electric signal in the sampling circuit 26, it is preferable to control sampling so that the electric signal is sampled only when the scanning mirror 25 reaches a position to execute the sampling, then an undistorted observation image is acquired.

Figure 4:
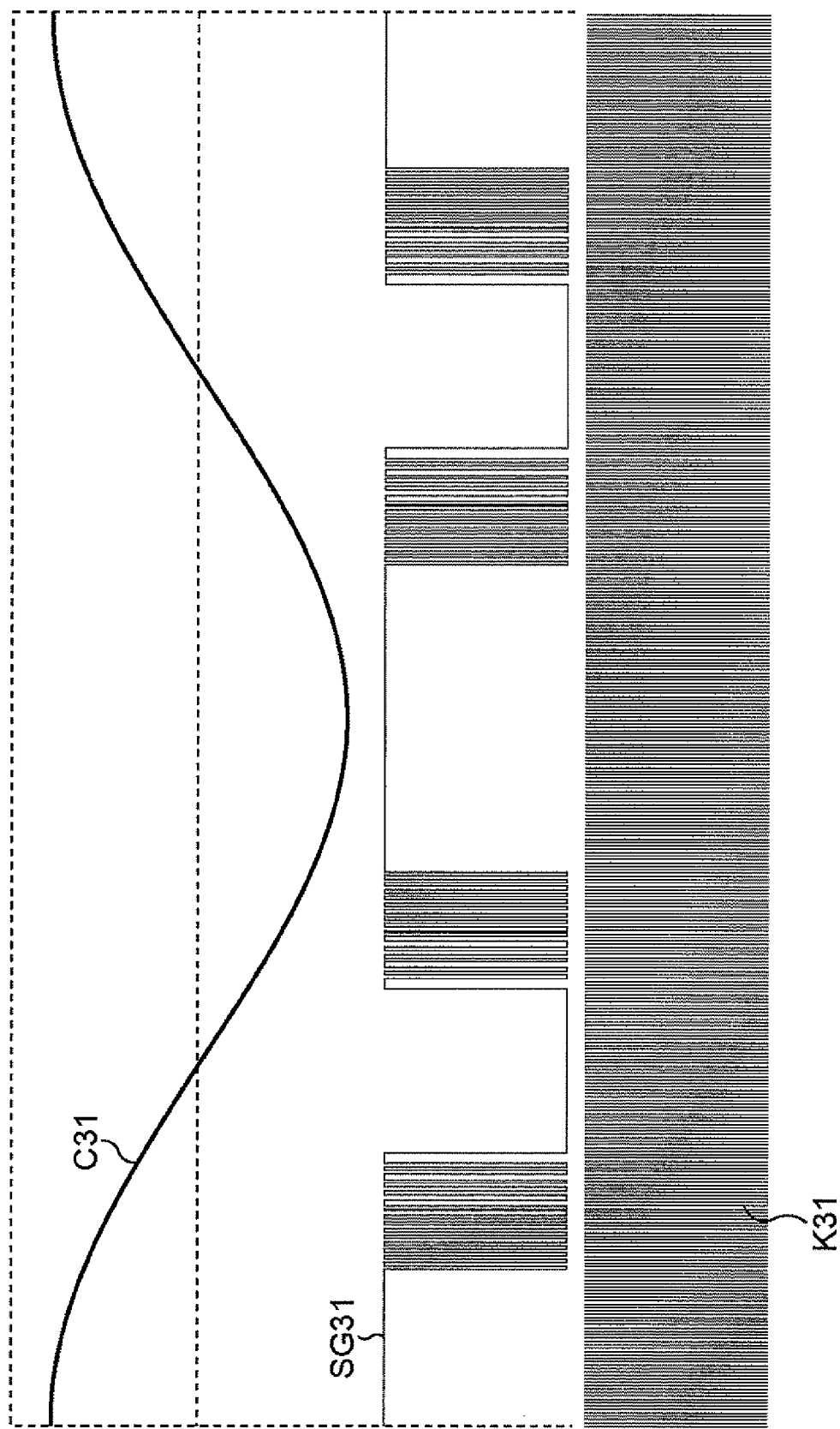
FIG. 4 is a diagram depicting a waveform example of a sampling enabling signal.

In FIG. 3, the inclination of the curve C11 to indicate the waveform of the driving signal is emphasized in order to make explanation clearer. Therefore the sampling enabling signal SG11 shown in FIG. 3 smoothly changes in the time direction, but actually the sampling enabling signal SG11 changes as shown in FIG. 4. FIG. 4 shows the driving signal C31, the sampling enabling signal SG31 and the sampling clock K31, and in FIG. 4 the virtual direction indicates a value of each signal and the horizontal direction indicates time.

In the example in FIG. 4, the waveform of the driving signal C31 is sinusoidal, and the sampling clock K31 is a rectangular wave which turns ON and OFF at a predetermined cycle. The sampling enabling signal SG31 is continuously enabled, that is Low, in the neighborhood of the inflection point of the driving signal C31, and is continuously disabled, that is High, in a portion where the amplitude of the driving signal C31 is highest or lowest. In the sampling enabling signal SG31, an enable period and a disable period are repeated between the period when the sampling enabling signal is continuously enabled and the period when the sampling enabling signal is continuously disabled, and the enable period is longer as the location is closer to the inflection point.

In FIG. 4, one line of data in a direction corresponding to the horizontal direction (hereafter called "x direction") in FIG. 1 is acquired in the observation image during a period from the moment when the amplitude of the driving signal is highest to the moment when the amplitude of the driving signal is lowest. In other words, this period is a period when the area of the sample 12 corresponding to one line of the observation image is scanned by the illumination light.

Figure 5:
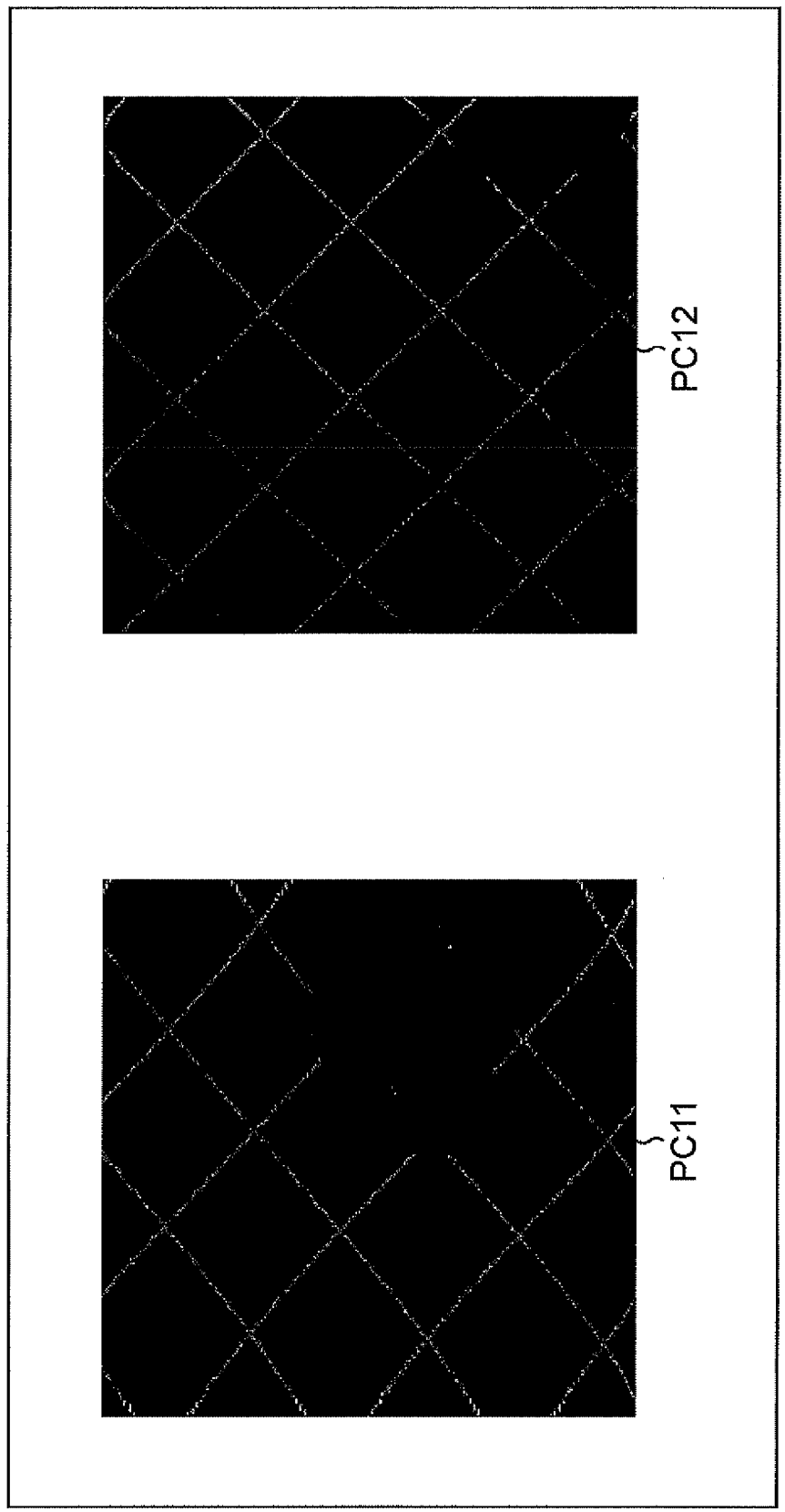
FIG. 5 shows examples of an observation image.

If the electric signal from the photodetector 23 is sampled based on the sampling enabling signal G31 and the sampling clock K31, an undistorted observation image, as shown in FIG. 5, is acquired.

The observation image PC11 is an observation image acquired by executing sampling for the lattice type sample constituted by straight lines according to a sampling clock having a predetermined frequency using a sinusoidal driving signal. In the observation image PC11, the pattern of the sample 12, which also should be constituted by straight lines diagonal to the right and straight lines diagonal to the left, is distorted. Whereas in the observation image PC12 acquired by executing sampling based on the sampling enabling signal GS31 and the sampling clock K31 in FIG. 3, straight lines diagonal to the right and straight lines diagonal to the left, which is the original pattern of the sample, are reproduced.

[Description on Driving Table Generation Processing]

Now a concrete operation of the scanning microscope 11 in FIG. 1 will be described.

If a waveform of a driving signal is specified by user operation, for example, the scanning microscope 11 performs the driving table generation processing and generates a driving table for operating the galvano-scanner 34 and the sampling circuit 26 according to the specified driving signal. Now the driving table generation processing by the scanning microscope 11 will be described with reference to the flow chart in FIG. 6.

In step S11, the computing unit 31 writes the driving data of the driving table in the memory of the table holding unit 30 according to the waveform of the driving signal specified by the user.

Figure 7:
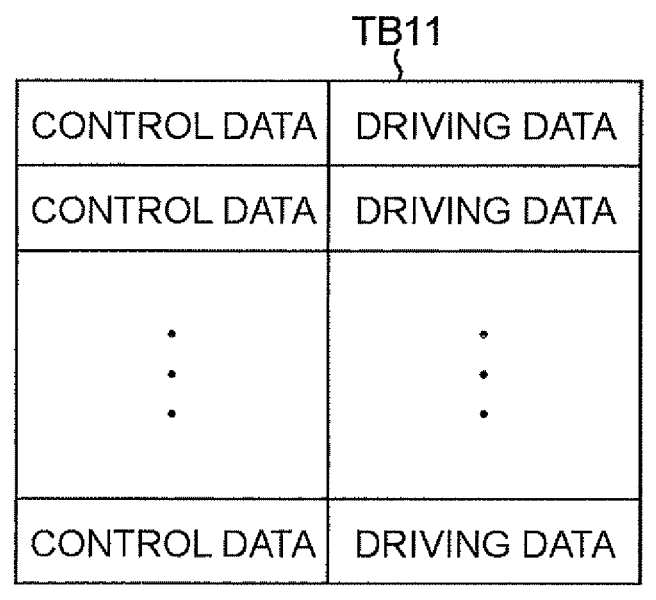

For example, the computing unit 31 records the driving table TB11 shown in FIG. 7 in the memory of the table holding unit 30. Driving data for moving the illumination light in the x direction on the sample 12 by rotating the scanning mirror 25 in FIG. 1 and the control data are stored in this driving table TB11.

In other words, one driving data in the driving table TB11 is data that indicates the driving voltage of the driving signal at a predetermined moment when the read clock falls, and the control data shown on the left of the driving data in FIG. 7 is control data attached to this driving data. The control data is constituted by a value of a sampling enabling signal and a value of a laser control signal at a predetermined moment.

In FIG. 7, a set of the driving data and the control data at each moment is arranged in a time series in the vertical direction of FIG. 7, and form one driving table TB11, where each set of driving data and control data is a bit string that is read in one address on the memory.

For example, when a driving signal having a waveform of the curve C11 in FIG. 3 is specified, the computing unit 31 stores each driving voltage value of the driving signal at each moment when the read clock K11 falls into a position of each driving data of the driving table TB11 in FIG. 7. Therefore the driving voltage of the driving signal at moment t1 in FIG. 3, for example, is stored in the portion of the driving data at the top in FIG. 7.

If the processing in step S11 is executed, only the driving data is written and the control data is not written in the driving table TB11.

Figure 6:
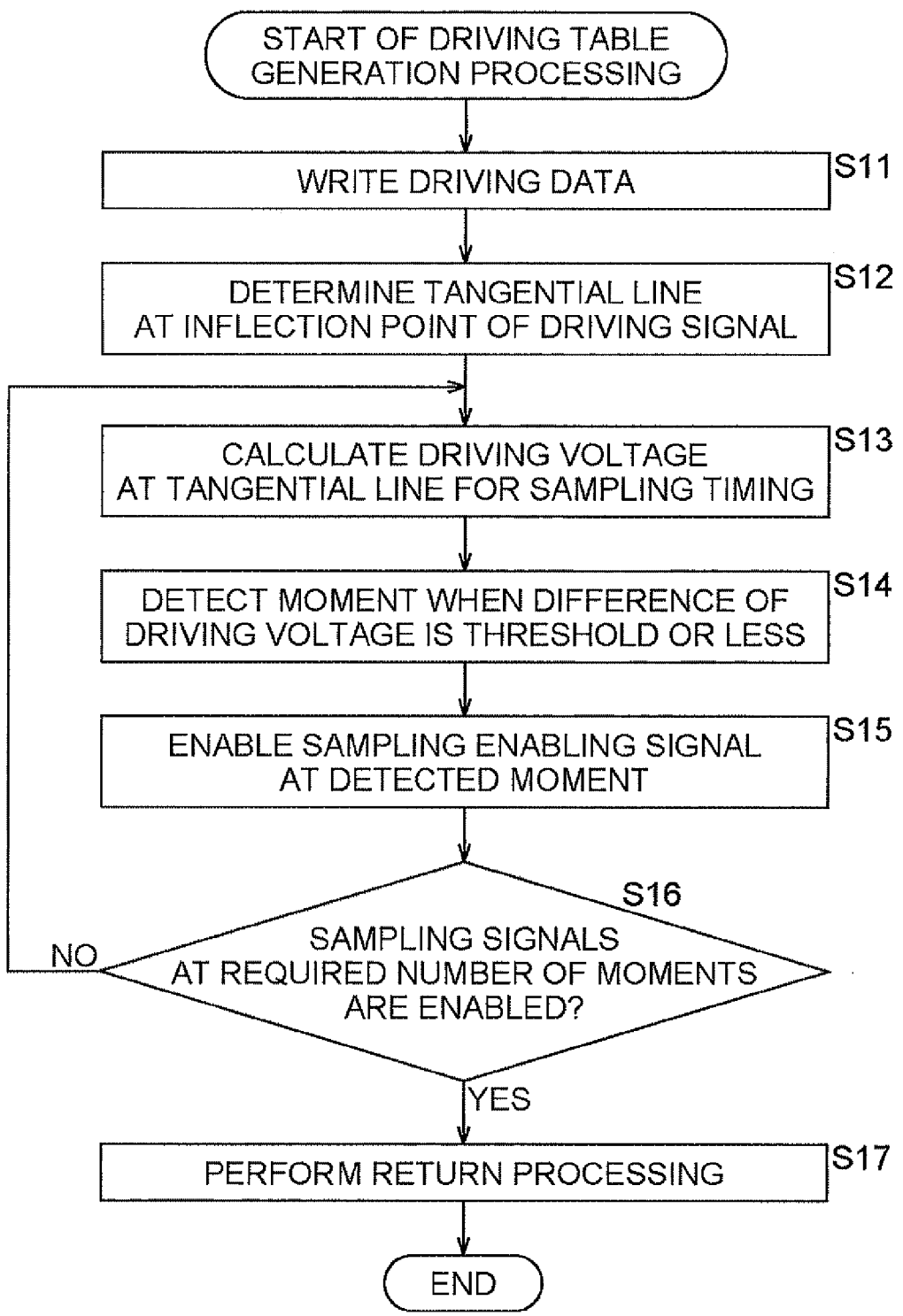
FIG. 6 is a flow chart depicting a driving table generation processing.

Referring back to the flow chart in FIG. 6, in step S12, the computing unit 31 determines a tangential line at an inflection point of the driving signal, based on the specified driving signal. Thereby the tangential line C12 in FIG. 3, for example, is determined.

In step S13, the computing unit 31 calculates the driving voltage value in the determined tangential line at a sampling timing determined by the sampling clock, that is, a moment when the sampling clock falls.

In concrete terms, for one inflection point, the computing unit 31 sequentially selects a moment when the sampling clock falls one by one as a processing target movement, from a moment closest to the moment when the inflection point is located. For example, in FIG. 3, if the point PS1 is a contact point between the driving signal and the tangential line C12, then the moment when the sampling clock K12 falls is sequentially selected one by one as a processing target from a moment closest to the moment t1 when the point PS1 is located, in either the direction to the future or the direction to the past. Therefore if a processing target timing is selected in the direction to the future, for example, the moment t1 to the moment t7 is sequentially selected as the processing target moment.

If one processing target moment is selected, the computing unit 31 calculates the driving voltage value at the location on the tangential line of the driving signal at this moment. For example, if the moment t1 in FIG. 3 is selected as a processing target moment, the driving voltage at the point PL1 on the tangential line C12 is calculated.

In step S14, the computing unit 31 refers to the driving table and detects, out of the moments when the sampling clock falls in the driving signal, a moment when the difference between the driving voltage value at this moment and the driving voltage value calculated in step S13 is threshold th or less.

For example, if the moment t1 in FIG. 3 is selected as a processing target moment, the driving voltage value at the point PL1 on the tangential line C12 is calculated in step S13, and the difference between this driving voltage value and the driving voltage value at the point PS1 at the moment t1 is determined first. Then it is determined whether the determined difference is the threshold th or less. In this case, the difference of the driving voltage value at the point PL1 and that at the point PS1 is the threshold th or less, which means that the moment t1 is detected as a moment when the difference is the threshold th or less.

If the moment t4 in FIG. 3 is selected as a processing target moment, for example, the difference between the driving voltage value at the point PL4 and that at the point PS4, and the threshold th are compared, and since this difference is greater than the threshold th, the difference of the driving voltage value at the adjacent point PS5 and that at the point PL4 is compared next with the threshold. In the example in FIG. 3, the difference of the driving voltage value at the point PS5 and that at the point PL4 is the threshold th or less, therefore the moment t5 where the point PS5 is located is detected as a moment when the difference is the threshold th or less.

Referring back to the flow chart in FIG. 6, in step S15, the computing unit 31 enables, in the driving table, the sampling enabling signal of the control data attached to the driving data at the moment detected in step S14.

For example, in a state where only the driving data is stored in the driving table, the portion of the sampling enabling signal included in each control data has a value to indicate that the sampling enabling signal is disabled, and in the same manner, the portion of the laser control signal of the control data has a value to indicate that the light source 21 is turned OFF.

It is assumed that in this state, the moment t5 is detected as a moment when the difference becomes the threshold th or less in step S14, for example. In this case, the computing unit 31 updates the portion of the sampling enabling signal of the control data attached to the driving data at the moment t5 in the driving table from the value to indicate disable to a vale to indicate enable. At the same time, in the driving table, the computing unit 31 updates the portion of the laser control signal of the control data attached to the driving data at the moment that is a predetermined time before the moment t5, from the value to indicate turn OFF to the value to indicate turn ON.

The reason why the value to indicate to turn ON is set for the laser control signal of the control data at the moment that is a predetermined time before the moment when the sampling enabling signal is enabled is because a delay is generated in turning the light source 21 ON or OFF. For example, to execute sampling at the moment t5, the laser control signal at a time that is before the moment t5 by a response delay time of the light source 21 is set to a value to indicate turn ON, then illumination light is emitted at the moment t5 when the scanning microscope 11 is actually operated.

In step S16, the computing unit 31 determines whether the sampling enabling signal was enabled at a required predetermined number of moments.

For example, if the sampling enabling signal of the control data is enabled for a half of the number of pixels in the direction corresponding to the x direction of the observation image, it is determined that the sampling enabling signal was enabled at a required number of moments in step S16.

If it is determined that the required number of sampling enabling signals were not enabled in step S16, processing returns to step S13 and the above mentioned processing is repeated. In other words, the moment of the next sampling timing becomes a processing target moment, and processing to determined whether the difference of the driving voltage is the threshold or less is performed.

If it is determined in step S16 that the required number of sampling enabling signals were enabled for a required number of times, on the other hand, the computing processing unit 31 executes a return processing in step S17.

For example, it is assumed that the above mentioned processing in step S13 to step S16 was executed for a predetermined period from the inflection point of the driving signal in the direction toward the future (hereafter called "processing completion period"). In this case, the computing unit 31 generates control data by reversing, in the time direction, the control data at each moment in the processing completion period. Then the computing unit 31 writes the generated control data in the driving table of control data, as control data at each moment in a period which is adjacent to the processing completion period in the driving table in the time direction toward the past, and which has the same length as the processing completion period.

For example, as FIG. 4 shows, the sampling enabling signal has a bilateral symmetric waveform of which center is the inflection point of the driving signal. In other words, the waveform in a predetermined period in the past direction from a moment corresponding to the inflection point of the sampling enabling signal is a waveform generated by returning (reversing) the waveform in the period in the future direction starting from the inflection point, which has the same length as the predetermined period.

Therefore if the control data is written from the moment corresponding to the inflection point in the future direction until the sampling signal is enabled, only for half the number of pixels in the direction corresponding to the x direction of the observation image, then the control data in the past can be acquired by reversing the acquired control data. If the control data in the future direction and the control data in the past direction acquired like this are used, the sampling is executed for the number of pixels in the direction corresponding to the x direction constituting the observation image, with the inflection point as the center. In other words, the pixel data is acquired for one line in a direction corresponding to the x direction of the observation image.

The driving signal has a sinusoidal form, which means that the driving data and the control data are the same for a neighborhood of each inflection point, hence if the driving data and the control data are generated for a neighborhood of one inflection point, the driving data and the control data can be acquired for neighborhoods of the other inflection points.

By performing this return processing, the driving table can be generated more quickly. If the return processing is performed in step S17, the driving table generation processing ends.

Thus the scanning microscope 11 generates a driving table constituted by the driving data and the control data at each moment, based on the specified driving signal. If the observation image is acquired using the driving table acquired like this, a substantial sampling timing is appropriately controlled by the sampling enabling signal, even if a sampling clock having a predetermined frequency is used, and an undistorted observation image can be acquired.

Furthermore, according to the scanning microscope 11, even in the case of scanning the sample 12 at high speed, an observation image of a desired area of the sample 12 can be acquired with a simple configuration using a simple processing of generating the driving table, without adding new hardware to the conventional configuration. In particular, an algorithm for generating the driving table from the driving signal is the same regardless the waveform of the driving signal, therefore any driving signal can be supported, no matter what the waveform of the signal.

In the above description, the control data is written after the driving data is written in the driving table, but the driving data and the control data may be written simultaneously. In this case, the driving voltage value of the driving signal and the driving voltage value of the tangential line at the processing target moment are calculated, and the difference of these driving voltage values is compared with the threshold. According to the result of this comparison with the threshold, the driving data and the control data are sequentially written in the driving table.

If the driving data and the control data are simultaneously written like this, the driving table can be more quickly acquired than the case of generating the control data by referring to the driving data written in the driving table, since referring to the driving data is unnecessary.

[Description of Observation Processing]

Figure 8:
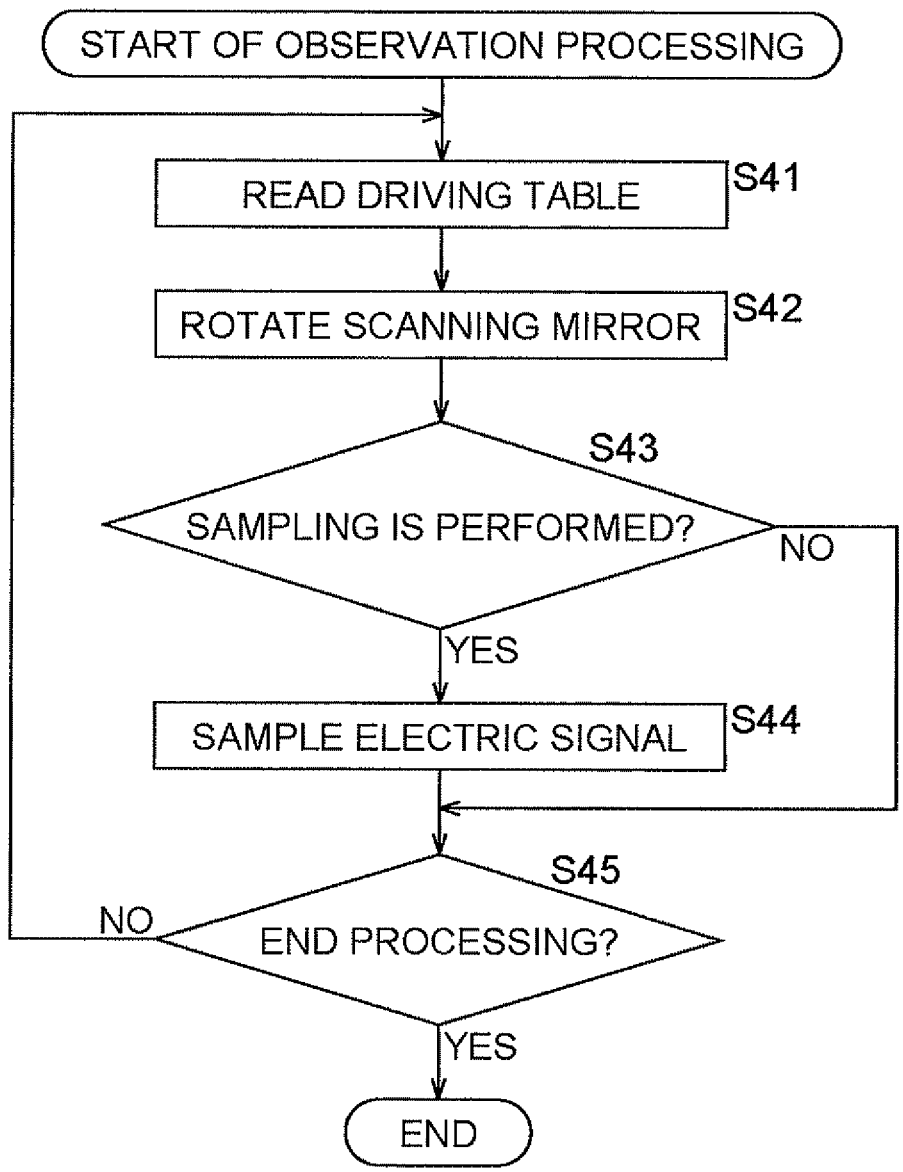
FIG. 8 is a flow chart depicting an observation processing.

After the driving table generation processing, described above, is executed and the driving table is recorded in the table holding unit 30, if the user operates the scanning microscope 11 and instructs the fluorescent observation of the sample 12, the scanning microscope 11 starts observation processing according to the instruction by the user. The observation processing by the scanning microscope 11 will now be described with reference to the flow chart in FIG. 8.

In step S41, the table holding unit 30 reads the driving table. In other words, the timing control circuit 29 generates an address of the driving data and the control data to be read from the driving table, in synchronization with the read clock, and supplies the address to the table holding unit 30. Then the table holding unit 30 reads the driving data and the control data stored in this address of the driving table.

The driving data read by the table holding unit 30 is supplied to the driving circuit 33 via the DA converter 32, the laser control signal out of the control data is supplied to the light source 21, and the sampling enabling signal out of the control data is supplied to the sampling circuit 26.

In step S42, the driving circuit 33 operates the galvano-scanner 34 according to the driving data from the DA converter 32, that is the driving signal. The galvano-scanner 34 rotates the scanning mirror 25 to a position determined by the driving voltage of the driving signal according to the instruction of the driving circuit 33. The light source 21 emits the illumination light according to the laser control signal supplied from the table holding unit 30. In other words, the illumination light is emitted if the laser control signal indicates turning the light ON, and the illumination light is not emitted if the laser control signal indicates turning the light OFF.

If the illumination light is emitted from the light source 21, the illumination light is irradiated onto the sample 12 via the optical system 22. If the scanning mirror 25 is rotated (deflected) by the galvano-scanner 34, the observation surface of the sample 12 is scanned by the illumination light. If the illumination light is irradiated onto the sample 12, the observation light is emitted from the sample 12, and this observation light is received by the photodetector 23 via the optical system 22. The photodetector 23 performs photoelectric conversion on the entered observation light, and supplies the acquired electric signal to the sampling circuit 26.

In step S43, the sampling circuit 26 determines whether the electric signal is sampled. For example, the sampling circuit 26 determines to execute the sampling if it is a timing when the sampling clock supplied from the timing control circuit 29 falls and a sampling enabling signal indicating enable is supplied from the table holding unit 30.

If it is determined that sampling is not executed in step S43, the processing in step S44 is skipped, and processing moves to step S45.

If it is determined that sampling is executed in step S43, the sampling circuit 26 samples the electric signal from the photodetector 23, converts the electric signal from an analog signal into a digital signal, and supplies the digital signal to the imaging circuit 27 in step S44.

The imaging circuit 27 stores the electric signal supplied from the sampling circuit 26 for a required number of pixels, so as to generate an observation image, and outputs the generated image to the monitor. Thereby the observation image is displayed on the monitor, for example, and the user can observe the sample 12.

If sampling is executed in step S44 or if it is determined that sampling is not executed in step S43, the scanning microscope 11 determines whether the processing ends in step S45. For example, it is determined that processing ends if all the driving data has been read from the driving table of the table holding unit 30, or the user instructs to end observation.

If it is determined that processing does not end in step S45, processing returns to step S41 and the above mentioned processing is repeated. In other words, the next driving data and the control data are read from the driving table, and the sample 12 is observed.

If it is determined that processing ends in step S45, on the other hand, each unit of the scanning microscope 11 stops the currently executing processing, and the observation processing ends.

Thus the scanning microscope 11 controls the driving of the galvano-scanner 34, the ON/OFF of the light source 21 and the sampling timing by the sampling circuit 26, according to the driving table. Therefore even if a sampling clock having a fixed cycle is used, sampling at an unequal interval can be implemented, and as a result, observation light from the area of the sample 12, at a same position as the case of driving the galvano-scanner 34 with a driving signal having a linear waveform, can be detected and generated into an image. Thereby an undistorted observation image can be acquired.

<Modification>

In the above description, the control data at each moment is generated based on the driving data, but in some cases an error may be generated between the position of the scanning mirror 25 (deflection angle) specified by the driving data and the actual position of the scanning mirror 25 when driven based on the driving data. Therefore the control data at each moment may be generated using a position signal which is outputted from the galvano-scanner 34, and indicates the actual position of the scanning mirror 25 (deflection angle).

Figure 9:
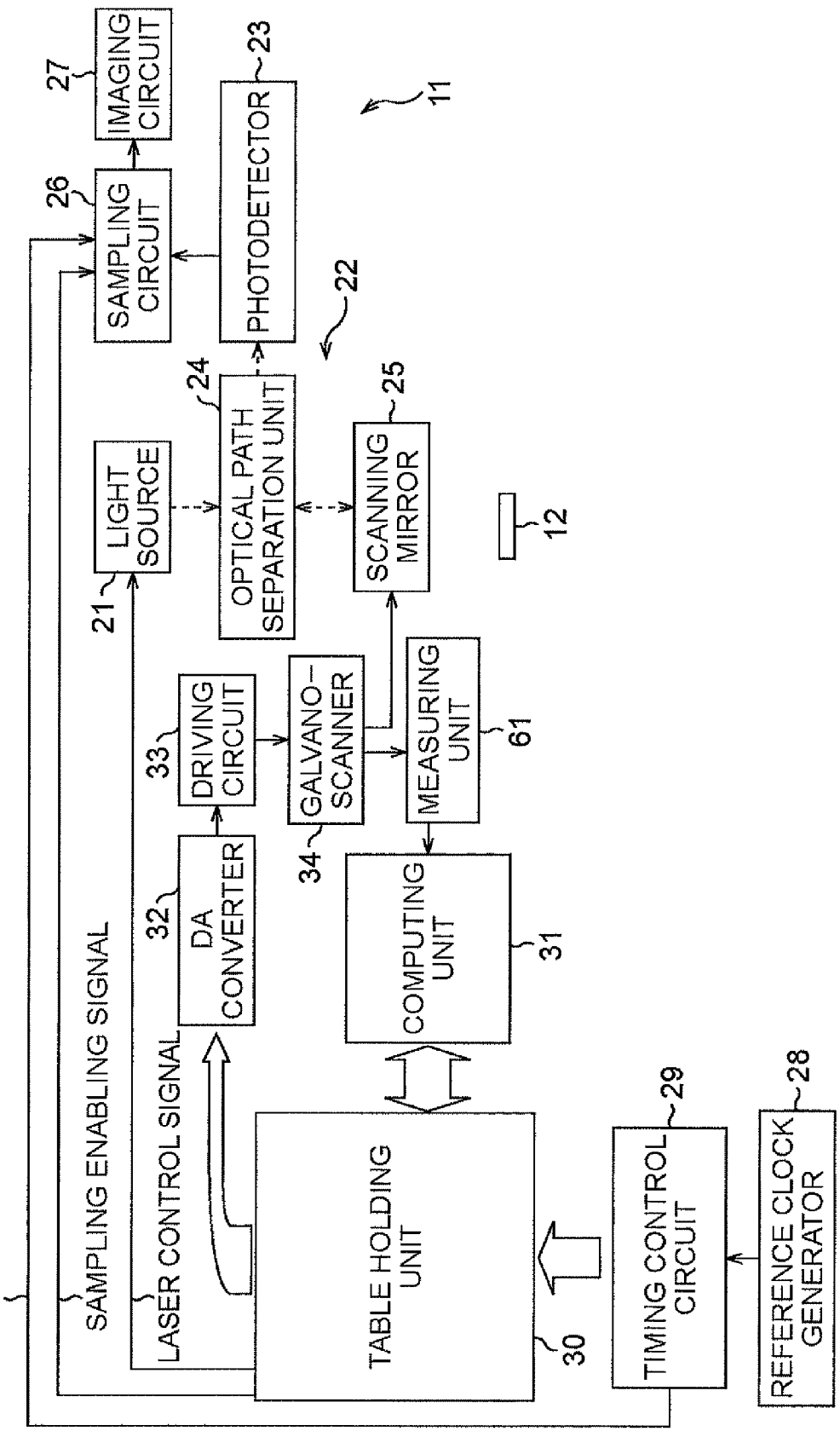
FIG. 9 is a diagram depicting another configuration example of the scanning microscope.

In this case, the scanning microscope 11 is configured as shown in FIG. 9, for example. In FIG. 9, a portion corresponding to a portion in the case of FIG. 1 is denoted with a same reference symbol, for which description may be omitted if appropriate.

The scanning microscope 11 in FIG. 9 is the scanning microscope 11 in FIG. 1 in which a measurement unit 61 is further included. The measurement unit 61 converts the position signal of the scanning mirror 25, which is outputted from the galvano-scanner 34, from an analog signal into a digital signal, and supplies the digital signal to the computing unit 31. Based on a position signal of the scanning mirror 25 at each moment supplied from the measurement unit 61, the computing unit 31 generates control data at each moment of the driving table, and records the control data in the data holding unit 30.

Operation of the scanning microscope 11 in FIG. 9 will now be described.

When the user specifies a waveform of the driving signal, for example, the scanning microscope 11 generates the driving data at each moment based on the specified driving signal, and stores the driving data in the driving table of the table holding unit 30. At this point, only the driving data is stored in the driving table.

If the driving data is acquired, the scanning microscope 11 performs preliminary driving of the galvano-scanner 34 using the driving data. In other words, the galvano-scanner 34 is actually driven using the acquired driving data. If the galvano-scanner 34 is driven according to the driving data stored in the driving table and the scanning mirror 25 rotates, then a position signal to indicate the actual position of the scanning mirror 25 is outputted from the galvano-scanner 34.

Then the computing unit 31 generates control data at each moment by executing a processing similar to step S12 to step S17 in FIG. 6 using a position signal at each moment supplied from the galvano-scanner 34 via the measurement unit 61, and stores the control data in the driving table.

For example, a value of the position signal at each moment is a value that indicates the driving voltage of the driving signal corresponding to the actual position of the scanning mirror 25 at each moment. As a concrete example, it is assumed that the driving voltage value of the driving signal to be supplied to the galvano-scanner 34 is B when the scanning mirror 25 is rotated to the position A, and if the scanning mirror 25 is rotated by the driving voltage B, the scanning mirror 25 is actually rotated to a position A+α. This means that the value of the position signal that is outputted from the galvano-scanner 34 becomes a value of the driving voltage of the driving signal supplied to the galvano-scanner 34 when the scanning mirror 25 is rotated to the position A+α.

In such a case, the computing unit 31 determines a tangential line at an inflection point of the waveform of the position signal. The computing unit 31 enables the sampling enabling signal only at a sampling timing when a difference between the value of the position signal at this moment and a value of the tangential line at a predetermined sampling timing is the threshold th or less.

In the example described above, the position signal is a signal that indicates a value of the driving voltage corresponding to the actual position of the scanning mirror 25, but it is sufficient if the position signal can specify an actual position of the scanning mirror 25. If the position signal can specify a position of the scanning mirror 25, the position signal and the driving signal are equivalent information, and the processing of each step in FIG. 6 can be implemented using the position signal.

If the preliminary driving of the galvano-scanner 34 is executed as described above, the control data is generated and the final driving data is acquired, hence fluorescent observation of the sample 12 becomes possible using this driving table. If the method of generating the driving table by the preliminary driving is used, the position of the scanning minor 25 is more accurately specified, therefore less distorted observation images can be acquired.

In the galvano-scanner 34, not only the scanning mirror 25 for scanning the illumination light in the lateral direction (x direction) in FIG. 9 but also a second scanning mirror for scanning the illumination light in the depth direction (hereafter called "y direction") in FIG. 9 may be installed. If the illumination light is scanned in the x and y directions by installing a second scanning mirror, then a two-dimensional observation image can be acquired.

In the case of two scanning mirrors installed in the scanning microscope 11, in one frame of the observation image acquisition period, scanning of the observation surface of the sample 12 in the x direction is executed for a predetermined number of times, whereas scanning thereof in the y direction is executed once, from one end to the other end of the observation surface. If scanning ends in the one frame of the observation image acquisition period, the second scanning mirror is returned to the position before the start of scanning, that is the position before rotation (hereafter called "return operation").

During the return operation of the second scanning mirror, the observation image cannot be acquired, but the scanning mirror 25 is driven continuously. Therefore during the return operation of the second scanning mirror, the computing unit 31 may regenerate the control data at each moment of the driving table based on the position signal from the galvano-scanner 34, and update the driving table. The control data may be generated during the return operation, using the position signal which is outputted while scanning in the x direction is actually being executed.

In the above description, the driving table in the x direction is generated, but the driving table in the y direction may be generated.

In this embodiment, the tangential line at the inflection point of the waveform of the driving signal (or the position signal) (or a neighborhood point of phase 0 or $\pi$ if the driving signal is sinusoidal) is determined as an approximate line, but the present invention is not limited to this, but any approximation method that can approximate the change of the waveform of the driving signal in the area to enable sampling may be used. For example, as FIG. 10 shows, a predetermined range (period) centering on phase 0 or $\pi$ may be set, and the line connecting the values at both ends of the driving signal (values of the position signal) in this range (average inclination in the neighborhood of phase 0 or $\pi$) may be used as the approximate line.

According to this embodiment, a concept of the approximate curve is introduced for the curve C11 in FIG. 3, which is a waveform of a driving signal to drive the galvano-scanner 34, and a driving voltage value of the curve C11 and that of the approximate curve at each moment to sample the electric signal, are compared, whereby the moment to enable execution of the sampling, out of the moments to sample the electric signal is determined, but the present invention is not limited to this.

For example, a reference value at each moment to sample the electric signal may be calculated respectively, so that the reference value is compared with the curve C11 at each moment to sample the electric signal, and the moment to enable execution of the sampling, out of the moments to sample the electric signal, is determined. Here the moments to sample the electric signal are at an equal interval as shown in FIG. 3, a value of the driving signal (driving voltage), that could be acquired at each moment to sample the electric signal if the waveform of the driving signal changed with respect to time, can be used as the reference value.

In this case, the execution of the sampling is enabled if the difference between the value of the driving signal and the reference value is a predetermined threshold or less.

A similar concept can be applied to the waveform of the position signal of the scanning mirror 25 as well. In other words, a reference value at each moment to sample the electric signal may be calculated respectively, so that the position signal at each moment to sample the electric signal and the reference value are compared, and the moment to enable execution of the sampling, out of the moments to sample the electric signal, is determined. Here the moments to sample the electric signal are at an equal interval as shown in FIG. 3, a value of the position signal, that could be acquired at each moment to sample the electric signal if the waveform of the position signal linearly changed with respect to time, can be used as the reference value. In this case as well, the execution of the sampling is enabled if the difference between the value of the position signal and the reference value is a predetermined threshold or less.

As a method of determining a moment to enable execution of the sampling, out of the moments to sample an electric signal, and sampling the electric signal at the determined moment to enable execution of the sampling, all the electric signals may be sampled once at the moments to sample the electric signal, and then the moment to enable execution of the sampling is determined according to the above mentioned method, and the electric signal acquired at the moment to enable execution of the sampling is sampled, whereby the image is generated.

Embodiments of the present invention are not limited to the above described embodiments, but various changes can be made within a scope not departing from the true spirit of the invention.

EXPLANATION OF REFERENCE NUMERALS 11 scanning microscope
12 sample
21 light source
22 optical system
23 photodetector
25 scanning mirror
26 sampling circuit
30 table holding unit
31 computing unit
34 galvano-scanner

The invention claimed is:

1. A scanning microscope, comprising:
a scanning unit that deflects illumination light from a light source by controlling a scanning member based on a driving signal which non-linearly changes with respect to time;
an optical detection unit that receives observation light from a sample and performs photoelectric conversion on the observation light so as to generate an electric signal;
a sampling unit that samples the electric signal generated by the optical detection unit; and
an imaging unit that generates an observation image of the sample, based on the sampled electric signal, wherein the cycle of the sampling is an integral multiple of a predetermined cycle.

2. The scanning microscope according to claim 1, further comprising:
a computing unit that computes a reference value at each moment to sample the electric signal; and
a determination unit that determines a moment to enable execution of the sampling, out of the moments to sample the electric signal, based on the value of the driving signal at the moment to sample the electric signal and the reference value, wherein the cycle of the sampling is determined based on the moment to enable execution of the sampling out of the moments to sample the electric signal.

3. The scanning microscope according to claim 2, wherein the reference value is a value that could be acquired at the moment to sample the electric signal if the driving signal linearly changed with respect to time.

4. The scanning microscope according to claim 2, wherein the determination unit determines the moment to enable execution of the sampling so that the sampling is executed only at a moment when a difference between the value of the driving signal and the reference value becomes a predetermined threshold or less.

5. The scanning microscope according to claim 2, wherein the determination unit generates a sampling enabling signal to indicate a moment to enable execution of the sampling, and
the sampling unit samples the electric signal at the moment indicated by the sampling enabling signal, out of the moments to sample the electric signal.

6. The scanning microscope according to claim 1, further comprising:
a computing unit that determines a predetermined approximate line in a waveform of the driving signal, and computes a value of the approximate line at each moment to sample the electric signal; and
a determination unit that determines a moment to enable execution of the sampling, out of the moments to sample the electric signal, based on the value of the driving signal at the moment to sample the electric signal and the value of the approximate line, wherein
the cycle of the sampling is determined based on the moment to enable execution of the sampling out of the moments to sample the electric signal.

7. The scanning microscope according to claim 6, wherein the determination unit determines the moment to enable execution of the sampling so that the sampling is executed only at a moment when a difference between the value of the driving signal and the value of the approximate line becomes a predetermined threshold or less.

8. The scanning microscope according to claim 7, wherein the scanning member is a scanning mirror, and the predetermined threshold is a voltage value of the driving signal that is required for rotating the scanning mirror for N times or 1/N times (N is any number equal to or greater than 1) of a distance that corresponds to one pixel of the observation image.

9. The scanning microscope according to claim 6, wherein the determination unit generates a sampling enabling signal to indicate a moment to enable execution of the sampling, and
the sampling unit samples the electric signal at the moment indicated by the sampling enabling signal, out of the moments to sample the electric signal.

10. The scanning microscope according to claim 9, further comprising: a holding unit that holds a driving table constituted by driving data to indicate the driving signal at each moment, and control data attached to the driving data and indicating the sampling enabling signal at each moment.

11. The scanning microscope according to claim 10, wherein
when the waveform of the driving signal is specified, the computing unit computes a value of the approximate line, and the determination unit generates the sampling enabling signal, and when the sample is observed, the scanning unit controls the scanning member based on the driving data read from the driving table, and the sampling unit samples the electric signal, based on a sampling clock and the control data read from the driving table.

12. A scanning microscope, comprising:
a scanning unit that deflects illumination light from a light source by controlling a scanning member based on a driving signal, and outputs a position signal to indicate a position of the controlled scanning member;
an optical detection unit that receives observation light from a sample and performs photoelectric conversion on the observation light so as to generate an electric signal;
a sampling unit that samples the electric signal generated by the optical detection unit; and
an imaging unit that generates an observation image of the sample, based on the sampled electric signal, wherein
the cycle of the sampling is an integral multiple of a predetermined cycle.

13. The scanning microscope according to claim 12, further comprising:
a computing unit that computes a reference value at each moment to sample the electric signal; and
a determination unit that determines a moment to enable execution of the sampling, out of the moments to sample the electric signal, based on the value of the position signal at the moment to sample the electric signal and the reference value, wherein
the cycle of the sampling is determined based on the moment to enable execution of the sampling out of the moments to sample the electric signal.

14. The scanning microscope according to claim 13, wherein the reference value is a value that could be acquired at the moment to sample the electric signal if the position signal linearly changed with respect to time.

15. The scanning microscope according to claim 13, wherein
the determination unit determines the moment to enable execution of the sampling so that the sampling is executed only at a moment when a difference between the value of the position signal and the reference value becomes a predetermined threshold or less.

16. The scanning microscope according to claim 13, wherein
the determination unit generates a sampling enabling signal to indicate a moment to enable execution of the sampling, and
the sampling unit samples the electric signal at the moment indicated by the sampling enabling signal, out of the moments to sample the electric signal.

17. The scanning microscope according to claim 12, further comprising:
a computing unit that determines a predetermined approximate line in a waveform of the position signal, and computes a value of the approximate line at each moment to sample the electric signal; and
a determination unit that determines a moment to enable execution of the sampling, out of the moments to sample the electric signal, based on the value of the position signal at the moment to sample the electric signal and the value of the approximate line, wherein
the cycle of the sampling is determined based on the moment to enable execution of the sampling out of the moments to sample the electric signal.

18. The scanning microscope according to claim 17, wherein
the determination unit determines the moment to enable execution of the sampling so that the sampling is executed only at a moment when a difference between the value of the position signal and the value of the approximate line becomes a predetermined threshold or less.

19. The scanning microscope according to claim 17, wherein
the determination unit generates a sampling enabling signal to indicate a moment to enable execution of the sampling, and
the sampling unit samples the electric signal at the moment indicated by the sampling enabling signal, out of the moments to sample the electric signal.

20. The scanning microscope according to claim 19, further comprising: a holding unit that holds a driving table constituted by driving data to indicate the driving signal at each moment, and control data attached to the driving data and indicating the sampling enabling signal at each moment.

21. The scanning microscope according to claim 20, wherein
in a period to acquire one frame of the observation image, the scanning unit deflects the illumination light from the light source by controlling another scanning member, to scan the sample with the illumination light in a direction approximately perpendicular to the scanning direction of the illumination light by the scanning member, and performs return operation to return the other scanning member back to a position before the control, and
the computing unit generates the sampling enabling signal using the position signal from the scanning unit, during the operation to return the other scanning member.

* * * * *